United States Patent [19]
Stepetic et al.

[11] Patent Number: 5,808,264
[45] Date of Patent: Sep. 15, 1998

[54] STUD WELDING DEVICE

[75] Inventors: Bruce Robert Stepetic, Warren; Todd William Dolinski, Memphis, both of Mich.

[73] Assignee: Emhart Inc., Newark, Del.

[21] Appl. No.: 742,719

[22] Filed: Nov. 1, 1996

[51] Int. Cl.$^6$ .................................................. B23K 9/20
[52] U.S. Cl. .............................................................. 219/98
[58] Field of Search .................................. 219/98, 99

[56]  References Cited

U.S. PATENT DOCUMENTS

| | | | |
|---|---|---|---|
| 3,448,236 | 6/1969 | Spisak | 219/98 |
| 4,137,445 | 1/1979 | Ettinger | 219/98 |
| 5,305,940 | 4/1994 | Gerhardt et al. | 219/98 |

*Primary Examiner*—Clifford C. Shaw
*Attorney, Agent, or Firm*—E. D. Murphy

[57]  ABSTRACT

A stud welding device comprises a receiver and a T-shaped transverse passage through which a T-stud may pass to an axial bore of the receiver and into the path of a plunger which carries the stud into a welding position. A fulcrum is provided in the axial bore about which the T-stud can pivot or rotate to a deflected position that avoids jamming.

8 Claims, 2 Drawing Sheets

STUD WELDING DEVICE

BACKGROUND OF THE INVENTION

This invention relates to stud welding devices which commonly use T-shaped studs having a shank and head of greater diameter than the shank. Such studs which are referred to as "T-studs" are often used in large quantities in the manufacture of automobiles. With the shank welded to a workpiece the head provides a convenient base for further attachments to be secured to the workpiece.

To achieve a high rate of attachment to the workpiece, T-studs are normally fed automatically by a feeding device to the stud welding device. Should a stud be misfed, however, jamming of the welding device can occur, thus bringing to a halt the operation of the production line while the jam is cleared and the welding device returned to its normal mode of operation.

One attempt to overcome the aforementioned problem is described in U.S. Pat. No. 5,305,940, assigned to the same assignee as the present invention, whose disclosure is incorporated herein by reference. In the '940 patent a spring means that operates like a clothespin is provided adjacent the axial bore of the stud welding device and is arranged to engage and hold a circumferential face of the head of a T-stud fed through a transverse passage into alignment with the axial bore, the axial bore being of a diameter corresponding to that of the head of the T-stud.

In this arrangement, however, the adjustment of the spring force is critical for holding the stud in place; any deviation from the holding force that is required can be detrimental to a proper holding operation for the stud and hence a proper feed. Also, heavier studs, such as those made from stainless steel, and those having a shorter shank length as well, tend to bounce out of this type of spring grip and thus skewer themselves into a potentially jamming position in the axial bore of the stud welding device.

OBJECT AND SUMMARY OF THE INVENTION

It is a primary purpose and principle object of the present invention to address the aforementioned problems and provide therefore a stud welding device for use in welding T-studs to a suitable workpiece in which the possibility of a T-stud becoming jammed in the welding device is avoided.

According to one embodiment of the present invention there is provided a receiver adapted to receive a T-stud from a feeding device comprising a T-shaped transverse passage through which a T-stud may pass to an axial bore which has a diameter corresponding to that of the head of the T-stud. A plunger is mounted for movement in the axial bore of the receiver so that moving from a retracted position to an advanced position it carries the T-stud located in the axial bore to position it against a workpiece for welding thereto. A fulcrum means in the form of a pair of spring-biased ball members is located adjacent the axial bore where the transverse passage meets with the axial bore. The ball members engage the underside of the upper portion of the circumferential face of the head of the T-stud fed through the transverse passage and thus cause it to be tipped or deflected in a direction in which the shank portion of the T-stud is rotated away from the interface between the feeder slot and the axial bore rather than towards it, which latter position could result in jamming. During its forward movement the plunger contacts the head of the T-stud in its misaligned or deflected position, above described, driving it forward and causing it to assume a proper orientation in the receiver bore. The spring-biased ball members give way once the T-stud is pushed forward by the plunger, so that the ball members themselves offer no resistance to the head of the T-stud once it is moving forward, nor do the ball members hold or grip the head. Their sole purpose is to tip or rotate the T-stud shank away from a potentially jamming position wherein the forward end of the shank of the T-stud might wedge against the interface between the feeder slot and the bore.

The invention will be better understood as well as further objects and advantages thereof become more apparent from the ensuing detailed description taken in conjunction with the drawings.

DETAILED DESCRIPTION

Figure 1:
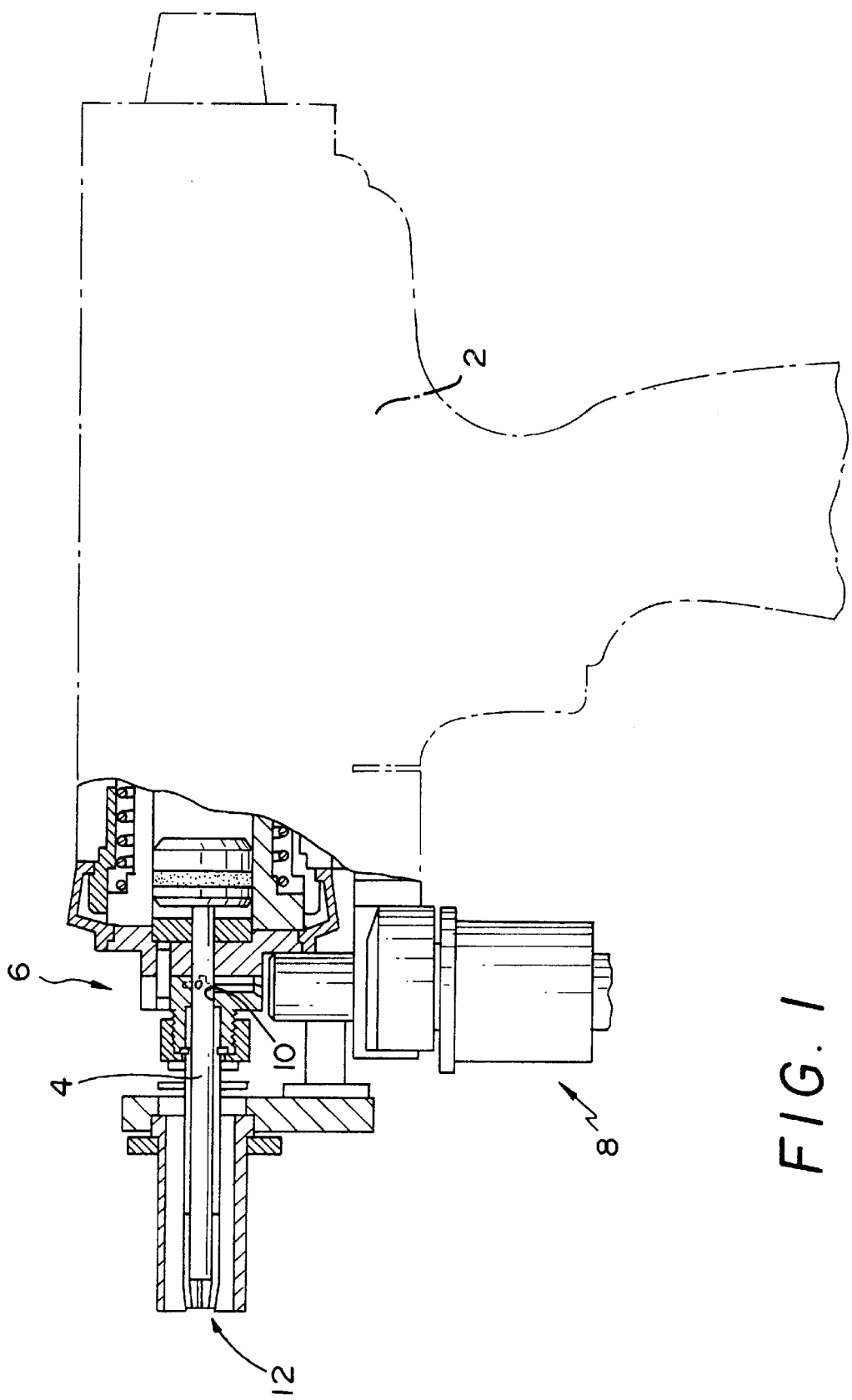
FIG. 1 is a schematic view, partly in cross-section, of the stud welding gun used in the invention.

Referring now to FIG. 1 there is shown a stud welding device 2 which is largely of conventional construction, comprising a plunger 4 which is movable between an advanced position (shown in FIG. 1) and a retracted position (not shown). A receiver portion 6 is also shown which is adapted to receive a T-stud T from a feeding device 8, only part of which is shown in FIG. 1. The receiver portion 6 comprises an axial bore 10 in which a T-stud may be located in the path of the plunger 4 which moves through the bore from its retracted to its advanced position carrying with it the stud to a nose piece 12 to thereby locate the stud against the workpiece for welding thereto.

The receiver portion 6 is shown in more detail in FIGS. 2–5 and is seen to comprise the bore 10, abovementioned, and a T-stud receiver feeder slot 14 which is connected to the feeding device (not shown). The feeder slot 14 is transverse with respect to the axial bore 10 and is defined by a narrow passage 16 and a superimposed wider passage 18, corresponding respectively to the shank portion 20 of the T-stud T and the head portion 22 thereof.

Figure 3:
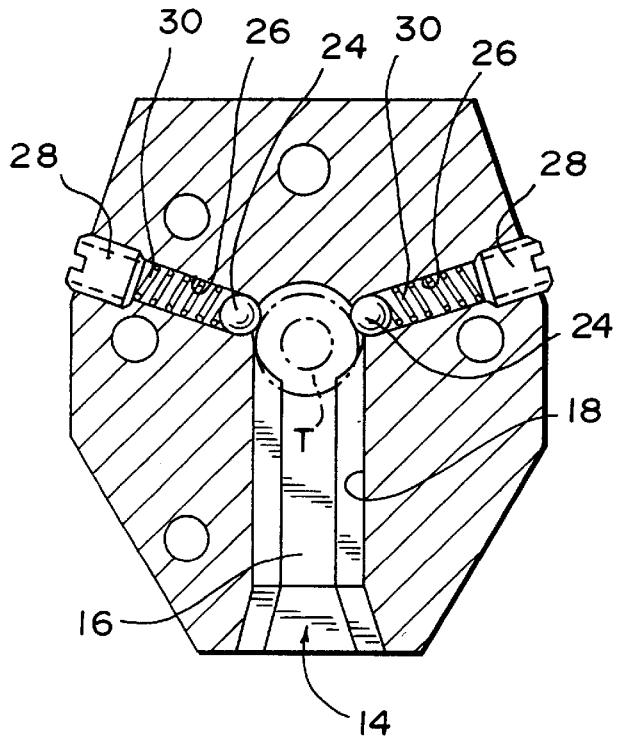
FIG. 3 is a schematic plan view in cross-section of the receiver portion of the stud welding device showing the location of the spring bias ball members.
Figure 5:
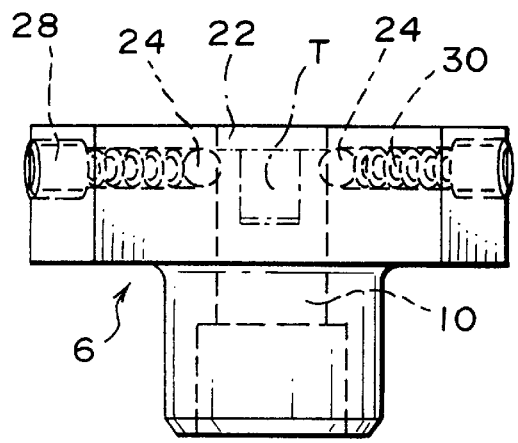
FIG. 5 is a schematic top end view of the receiver portion of the stud welding device with the spring biased ball members shown in phantom.

As best shown in FIGS. 3 and 5, a pair of spring-biased ball members 24, preferably steel, are shown positioned in passage ways 26 of the receiver portion 6 that communicate with the bore 10 where the wide passage way 18 for the head 22 of the T-stud T meets with the axial bore. Each of the passage ways 26 comprise a set screw 28 and a coil spring member 30 which presses against the ball member 24 and whose spring force can be varied by means of the set screw 28. The respective diameters of the exit holes of the passage ways 26 are of course less than the diameter of the ball members and of the passage ways themselves, thereby insuring that the ball members 24 do not exit the passage ways either by gravity or by pressure from the spring members 30. The ball members 24 act as fulcrum or pivot points at the underside of the upper circumferential face of the head 22 of the stud T, as will be explained in more detail below.

Figure 2:
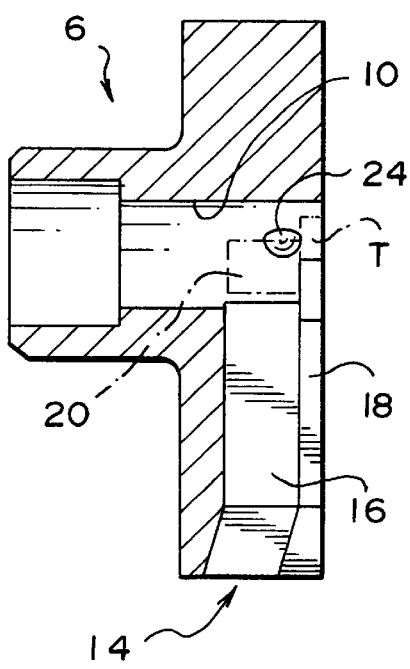
FIG. 2 is a schematic cross-section of the receiver portion according to the invention showing the T-stud entering the axial bore of the stud welding device.
Figure 4:
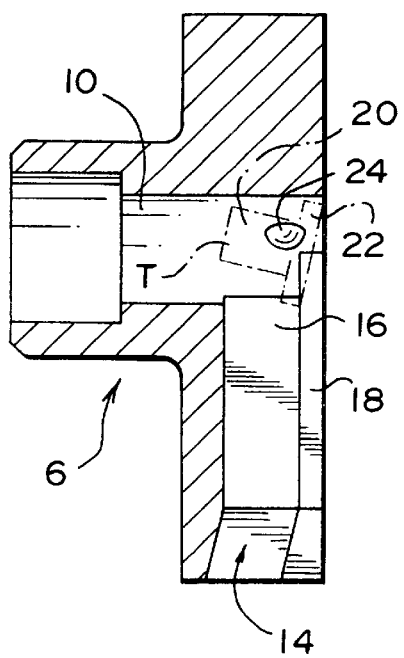
FIG. 4 is a schematic cross-section of the receiver portion according to the invention showing the T-stud being tipped in the axial bore prior to engagement by the plunger.

The stud welding device according to the invention operates as follows. When a stud T enters the bore 10 from the feeder slot 14, the underside of the head portion 22 approaches the protruding surfaces of the ball members 24 in the axial bore 10, as best shown in FIGS. 2 and 3. Further transverse movement of the stud T into the axial bore causes the ball members to act as a fulcrum about which the stud T rotates itself into a misaligned or deflected position in which the forward end of the shank 20 moves away from the interface of the feeder slot and the bore, as best shown in FIG. 4. Each and every stud T behaves in this manner; that is, it is tipped by the ball members 24 to rotate in a direction away from a potentially jamming position in which the forward end of the shank might catch on the interface between the feeder slot 14 and the bore 10 before the plunger 4 advances to contact the head of the stud T. Once the T-stud is in its deflected position, the forward thrust of the plunger 4 pushes the head 22 of the stud T forward and eventually aligns the misaligned stud T within the receiver bore but well after the forward end of the shank 20 has cleared the interface between the feeder slot and the bore. It is important to stress that the ball members 24 do not act to hold the stud T in any one position but merely act as fulcrum about which the stud pivots to a deflected position. And because of the precise locations of the ball members the T-stud can only rotate or deflect in the one direction so that the shank 20 rotates away from the interface between the receiver bore and the feeder slot. Once the plunger contacts the head of the T-stud it forces the head of the stud past the bias of the ball members, causing them to recede momentarily into their respective passageways 26.

In previous arrangements when the stud T was presented to the plunger in a normal attitude, that is, with the head held at right angles to the axis of the bore and the plunger, it was found that the stud was then vulnerable to random shifting or tipping in one of several misaligned directions when hit by the plunger. In this way the forward end of the shank would often fail to clear the interface between the feeder slot and the axial bore of the receiver, which of course resulted in jamming. In the present invention, however, the forward end of the shank 20 of the T-stud is always tipped or deflected in the same way, that is, it is positioned remotely from the aforementioned interface, so that jamming is avoided.

The present invention is especially useful with heavier T-studs constructed of stainless steel and also with T-studs that have a relatively short shank with respect to the diameter of the head, since these kinds of studs tend to destabilize easily when gripped or held by the conventional spring means. With the present invention, however, such T-studs are easily tipped into a direction that rotates the stud away from a potentially jamming position, as above described. And in this position they are readily returned to an aligned position by the thrust of the plunger, once the shank of the T-stud clears the interface between the feeder slot and the receiver bore.

The foregoing relates to a preferred exemplary embodiment of the present invention, it being understood that other embodiments and variants thereof are possible within the scope of the invention, the latter being defined by the appended claims.

What is claimed and desired to be secured by Letters Patent of the United States is:

1. A stud welding device comprising
   a plunger movable between an advanced and retracted position,
   a receiver for receiving a T-stud from a feeding device including a T-shaped transverse passage through which said T-stud may pass to an axial bore having a diameter corresponding to that of the head of said T-stud,
   said plunger being mounted for movement in said axial bore of said receiver so that said plunger in moving from its retracted position to its advanced position carries said T-stud located in said axial bore to locate said T-stud against a workpiece for welding thereto, and
   fulcrum means adjacent said axial bore for contacting an upper portion of the circumferential face of the head of said T-stud fed through said transverse passage into said axial bore, whereby said T-stud is caused to rotate about said fulcrum means to a deflected position remote from a potentially jamming position in said axial bore.

2. A stud welding device according to claim 1, wherein said fulcrum means is a pair of ball members disposed in a pair of passage ways in said receiver communicating with said axial bore, said ball members having a diameter slightly larger than the exit hole of said passage ways, and said ball members having a spring bias means for causing said ball members to protrude slightly into said axial bore.

3. A stud welding device according to claim 2, wherein said ball members are composed of steel.

4. A stud welding device according to claim 2, wherein said spring bias means for said ball members comprises threaded means for varying the bias of said spring bias means.

5. A stud welding device according to claim 1, wherein said potentially jamming position for said T-stud is one in which the forward end of the shank portion of said T-stud catches against an interface between said T-shaped transverse passage and said axial bore.

6. A stud welding device according to claim 5, wherein said deflected position for said T-stud is one in which the forward end of the shank portion of said T-stud is remote from said interface between said T-shaped transverse passage and said axial bore.

7. A stud welding device according to claim 1, wherein said T-stud has a relatively short shank with respect to the diameter of the head thereof.

8. A stud welding device according to claim 7, wherein said T-stud is composed of a relatively heavy material, such as stainless steel.

* * * * *